United States Patent [19]

Fukada et al.

[11] Patent Number: 5,000,129
[45] Date of Patent: Mar. 19, 1991

[54] INTAKE SYSTEM FOR INTERNAL COMBUSTION ENGINE

[75] Inventors: Hirotaka Fukada; Fusatoshi Tanaka; Nobuyuki Matubara; Yasuhiro Okasako, all of Hiroshima, Japan

[73] Assignee: Mazda Motor Corporation, Hiroshima, Japan

[21] Appl. No.: 547,029

[22] Filed: Jul. 2, 1990

[30] Foreign Application Priority Data

Jun. 30, 1989 [JP] Japan .................................. 1-170541

[51] Int. Cl.⁵ ........................................... F02M 35/10
[52] U.S. Cl. ............................................... 123/52 MV
[58] Field of Search ......... 123/52 M, 52 MB, 52 MC, 123/52 MV

[56] References Cited

U.S. PATENT DOCUMENTS

| | | | |
|---|---|---|---|
| 2,916,027 | 12/1959 | Chayne et al. | 123/52 MV |
| 3,171,393 | 3/1965 | Platner et al. | 123/55 VE |
| 3,742,923 | 7/1973 | Oblander et al. | 123/52 MV |
| 4,577,596 | 3/1986 | Senga | 123/52 MV |
| 4,641,610 | 2/1987 | Rutschmann | 123/52 MV |
| 4,932,368 | 6/1990 | Abe et al. | 123/52 MV |

FOREIGN PATENT DOCUMENTS

| | | | |
|---|---|---|---|
| 2930697 | 2/1981 | Fed. Rep. of Germany | 123/52 MV |
| 60-156926 | 8/1985 | Japan | |

*Primary Examiner*—David A. Okonsky
*Attorney, Agent, or Firm*—Sixbey, Friedman, Leedom & Ferguson

[57] ABSTRACT

An intake system for a V-type engine having a plurality of cylinders disposed in each of left and right cylinder banks has a central surge tank which is disposed above the space between the left and right cylinder banks and communicates with the atmosphere through a common intake passage, and left and right surge tanks which are respectively disposed above the left and right cylinder banks. Communicating passages connect the central surge tank with the left and right surge tanks, and discrete intake passages communicate the left and right surge tanks with the cylinders. At least one of the communicating passages on each side of the central surge tank is disposed between the discrete intake passages on the side of the central surge tank.

8 Claims, 5 Drawing Sheets

INTAKE SYSTEM FOR INTERNAL COMBUSTION ENGINE

BACKGROUND OF THE INVENTION

1. Field of the Invention

This invention relates to an intake system for an internal combustion engine, and more particularly to an intake system for a V-type internal combustion engine having a surge tank.

2. Description of the Prior Art

In the intake system for a V-type engine disclosed in Japanese Unexamined Patent Publication No. 60(1985)-156926, three surge tanks are respectively provided above the respective cylinder banks and above the space between the cylinder banks and communicate with the atmosphere by way of an intake air introducing passage the downstream end portion of which is trifurcated into three branches each connected to one end of one of the surge tanks. The surge tank above each of the cylinder banks communicates with the respective cylinders in the other cylinder bank through a low engine speed intake passages which are relatively long. The surge tank above the space between the cylinder banks communicate with the cylinders in the respective cylinder banks through a high engine speed intake passages which are relatively short and are provided with control valves. In a low engine speed range, the control valves are closed, and intake air introduced into the surge tanks above the respective cylinder banks flows into the cylinders through the low engine speed intake passages. In the low engine speed range, inertia effect of intake air corresponding to the equivalent length of each of the low engine speed intake passages is obtained. In a high engine speed range, the control valves are opened, and intake air is partly introduced into the cylinders through the surge tank above the space between the cylinder banks and the high engine speed intake passages, and is partly introduced into the cylinders through the surge tanks above the cylinder banks and the low engine speed intake passages. In the high engine speed range, inertia effect of intake air corresponding to the equivalent length of each of the high engine speed intake passages is obtained.

Though the larger the volume of the surge tank is, the better in order to suppress the intake air interference, the overall size of the engine becomes too large when the surge tank is simply large in size.

SUMMARY OF THE INVENTION

In view of the foregoing observations and description, the primary object of the present invention is to provide an intake system for a V-type engine in which the effective volume of the surge tank can be increased without substantially increasing the overall size of the engine.

In accordance with the present invention, there is provided an intake system for a V-type engine having a plurality of cylinders disposed in each of left and right cylinder banks comprising a central surge tank which is disposed above the space between the left and right cylinder banks and communicates with the atmosphere through a common intake passage, left and right surge tanks which are respectively disposed above the left and right cylinder banks, communicating passages which connect the central surge tank with the left and right surge tanks, and discrete intake passages which communicate the left and right surge tanks with the cylinders, at least one of the communicating passages on each side of the central surge tank being disposed between the discrete intake passages on the side of the central surge tank.

Since the three surge tanks are operatively integrated with each other by the communicating passages and function as a single surge tank having a large volume, accordingly, the intake air interference is effectively suppressed. Further since the communicating passage is disposed between the discrete intake passages, the overall size of the engine is not substantially increased. It is preferred that the overall cross-sectional area of the communicating passage be as large as possible since if the overall cross-sectional area of the communicating passages is small, resonance which can adversely affect the charging efficiency in the high engine speed range can be generated.

DESCRIPTION OF THE PREFERRED EMBODIMENT

Figure 1:
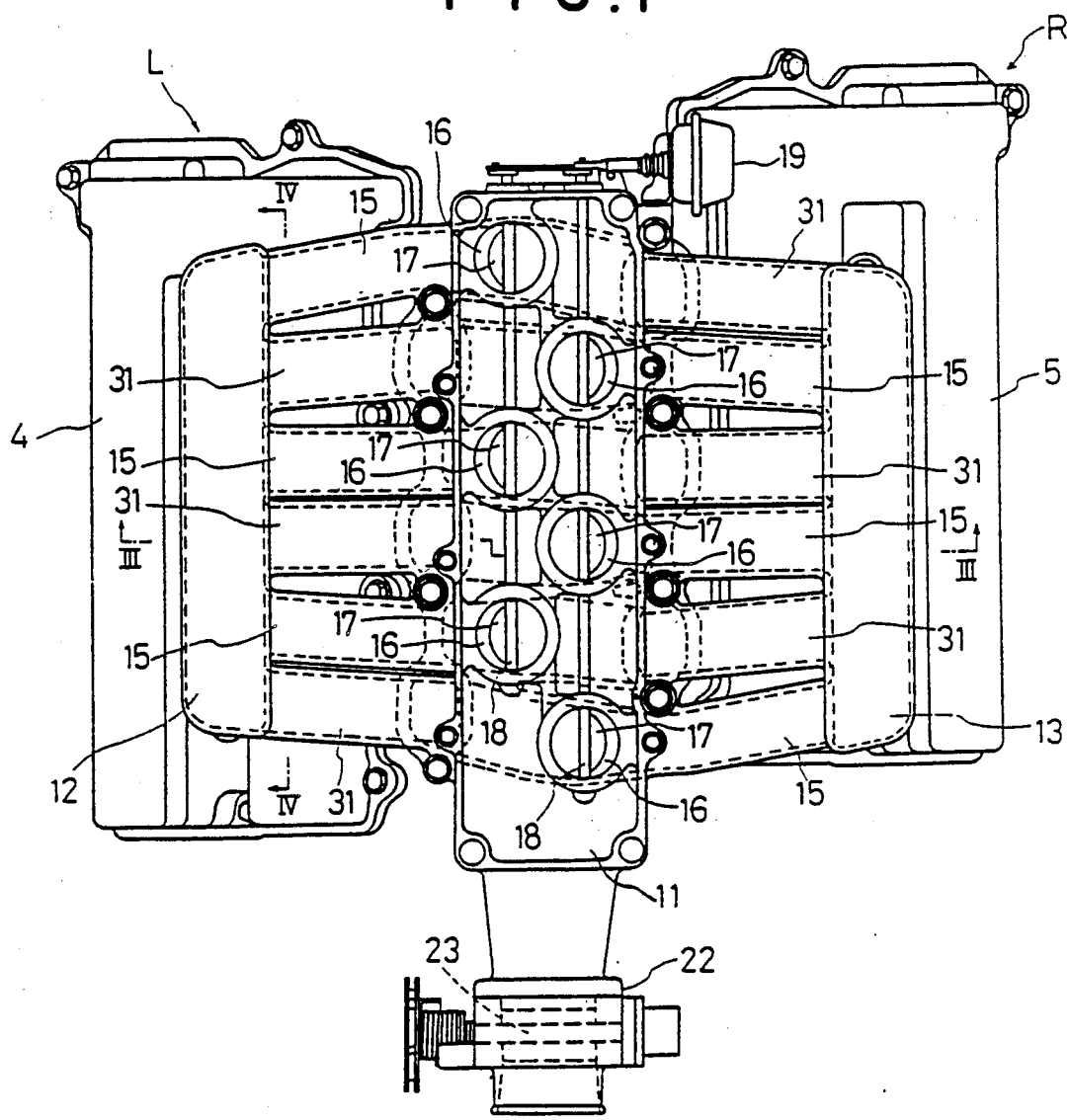
FIG. 1 is a plan view showing an intake system in accordance with an embodiment of the present invention with the lid of the first surge tank removed.
Figure 2:
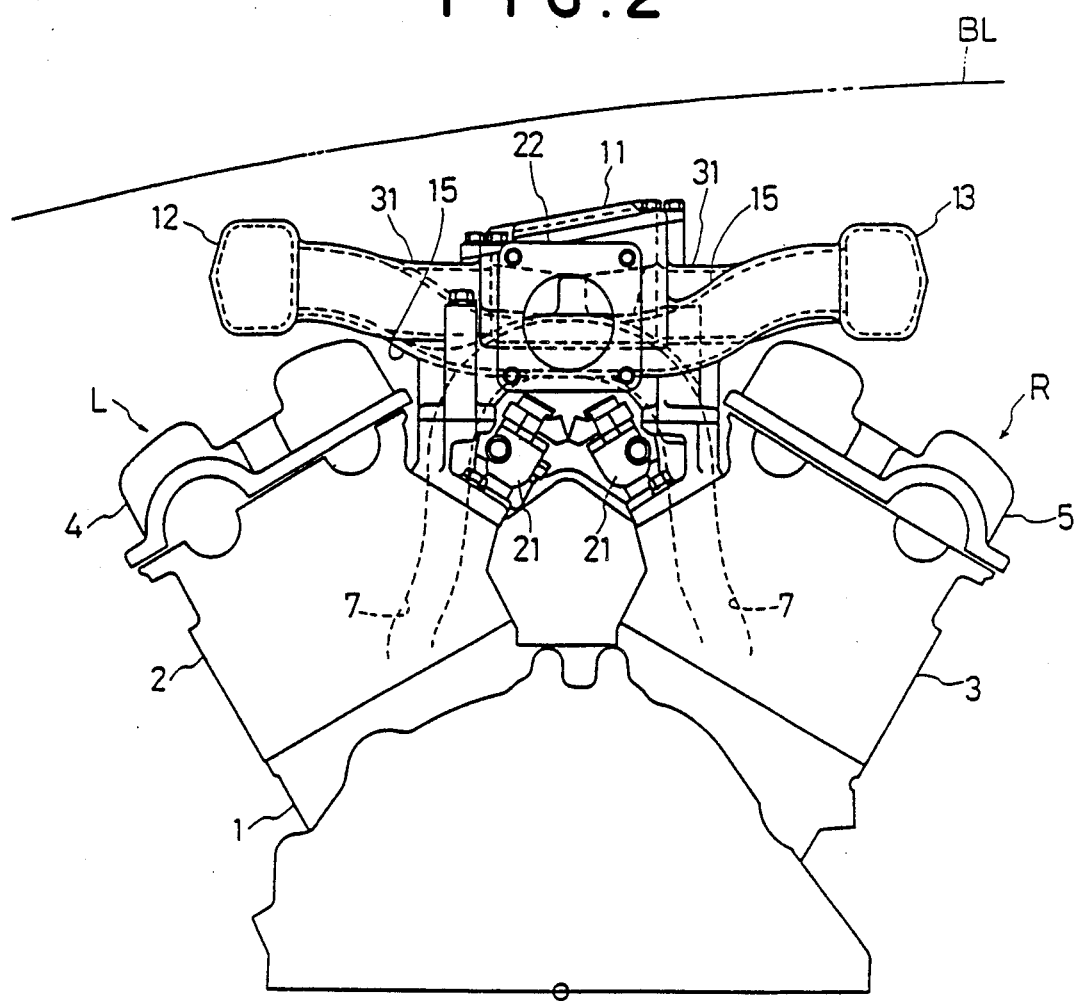
FIG. 2 is a side view of the intake system.
Figure 3:
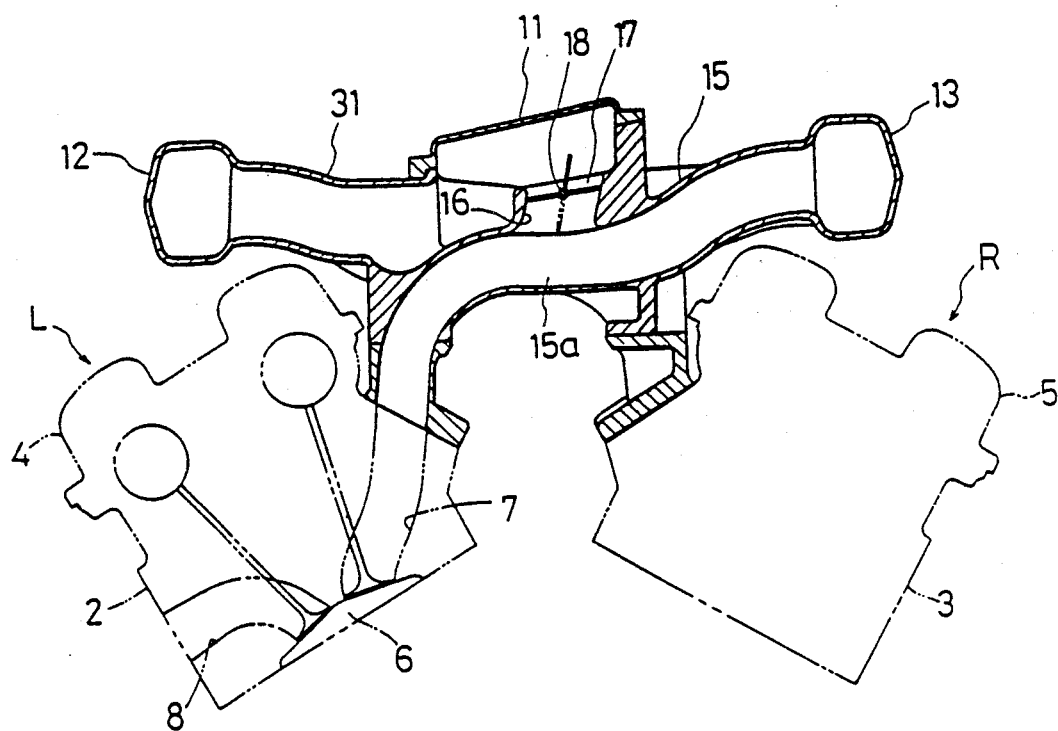
FIG. 3 is a cross-sectional view taken along line III—III in FIG. 1.
Figure 4:
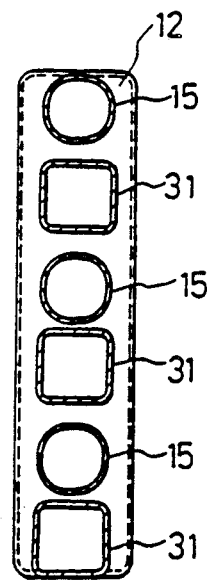
FIG. 4 is a cross-sectional view taken along line IV—IV in FIG. 1.

In FIGS. 1 to 4, a V-6 engine provided with an intake system in accordance with an embodiment of the present invention has a cylinder block 1, and left and right cylinder heads 2 and 3 which respectively form left and right cylinder banks L and R. Three cylinders which form combustion chambers 6 together with pistons (not shown) are formed in each of the cylinder heads 2 and 3. Cylinder head covers 4 and 5 are mounted on the respective cylinder heads 2 and 3. Each cylinder is provided with an intake port 7 and an exhaust port 8. Each intake port 7 opens to the space between the cylinder banks L and R, and each exhaust port 8 opens in the outer side of the cylinder bank.

A rectangular first surge tank 11 extends in the direction of the cylinder row above the space between the cylinder banks L and R. Second and third surge tanks 12 and which are rectangular extend in the direction of the cylinder row above the respective cylinder banks L and R.

The second surge tank 12 above the left cylinder bank L communicates with the intake ports 7 in the right cylinder bank R through discrete intake passages 15, and the third surge tank 13 above the right cylinder bank R communicates with the intake ports in the left cylinder bank L through discrete intake passages 15. Each discrete intake passage 15 extends from the inner side of the corresponding surge tank in the direction perpendicular to the cylinder row and has an intermediate portion 15a which extends along the lower surface of the first surge tank 11. The discrete intake passages 15 are at substantially regular intervals in the direction of the cylinder row.

Each discrete intake passage 15 is connected to the first surge tank 11 at the intermediate portion 15a through a bypass passage 16 which is provided with a butterfly on-off valve 17. Three on-off valves 17 in the three discrete intake passages 15 connected to the cylinders in each cylinder bank are connected with each other by a shaft 18. The shafts 18 are driven by an actuator 19 which operates under intake vacuum.

Each discrete intake passage 15 is provided with a fuel injector 21 at the intake port side end portion thereof. A throttle body 22 provided with a throttle valve 23 is connected to one end of the first surge tank 11.

The second surge tank 12 communicates with the first surge tank 11 through three communicating passages 31, and also the third surge tank 13 communicates with the first surge tank 11 through three communicating passages 31. The three discrete intake passages 15 and the three communicating passages 31 on each side of the first surge tank 11 alternate with each other as viewed from above as clearly shown in FIGS. 1 and 4.

In a low engine speed range, the actuator 19 closes the on-off valves 17. Accordingly, intake air introduced into the first surge tank 11 through the throttle body 22 flows into the second and third surge tanks 12 and 13 and then into the respective combustion chambers 6 through the discrete intake passages 15 and the intake ports 7. In the low engine speed range, inertia effect of intake air corresponding to the sum of the equivalent lengths of each discrete intake passage 15 and each intake port 7 is obtained.

In a high engine speed range, the actuator 19 closes the on-off valves 17. Accordingly, a part of intake air introduced into the first surge tank 11 through the throttle body 22 flows into the second and third surge tanks 12 and 13 and then into the respective combustion chambers 6 through the discrete intake passages 15 and the intake ports 7, and the other part of the intake air flows into the intermediate portions 15a of the discrete intake passages 15 through the bypass passages 16 and then into the respective combustion chambers 6 through the downstream side end portions of the discrete intake passages 15 and the intake ports 7. In the high engine speed range, there is obtained inertia effect of intake air corresponding to the sum of the equivalent lengths of each bypass passage 16, the end portion of each discrete intake passage 15 downstream of the intermediate portion 15a and each intake port 7 which is shorter than the sum of the equivalent lengths of each discrete intake passage 15 and each intake port 7.

In this embodiment, the first surge tank 11 communicates with each of the second and third surge tanks 12 and 13 through three communicating passage 31. Accordingly, the three surge tanks 11, 12 and 13 are operatively integrated with each other to function as a single surge tank having a large volume, and the intake air interference is effectively suppressed and the inertia effect of intake air is enhanced. Further since two of the three communicating passages 31 are disposed between the discrete intake passages 15, the overall size of the engine is not substantially increased.

Figure 5:
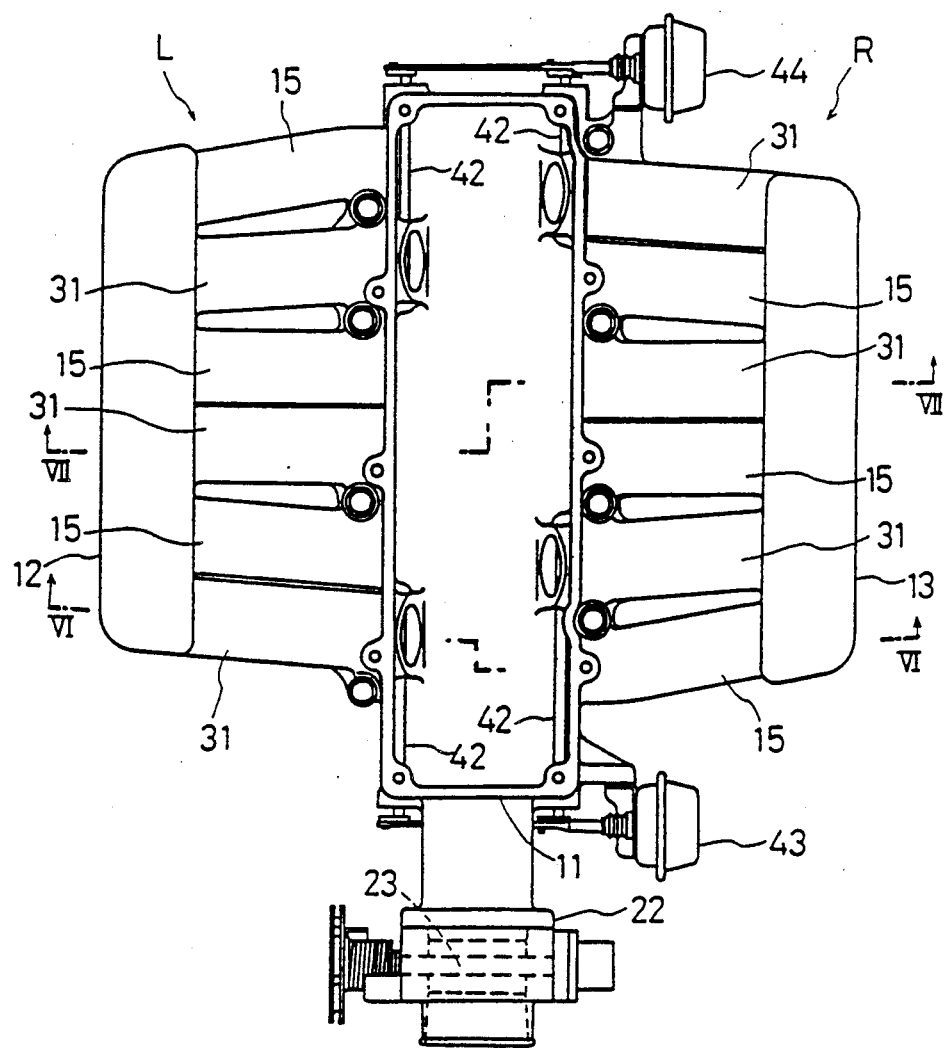
FIG. 5 is a plan view showing an intake system in accordance with another embodiment of the present invention with the lid of the first surge tank removed.
Figure 6:
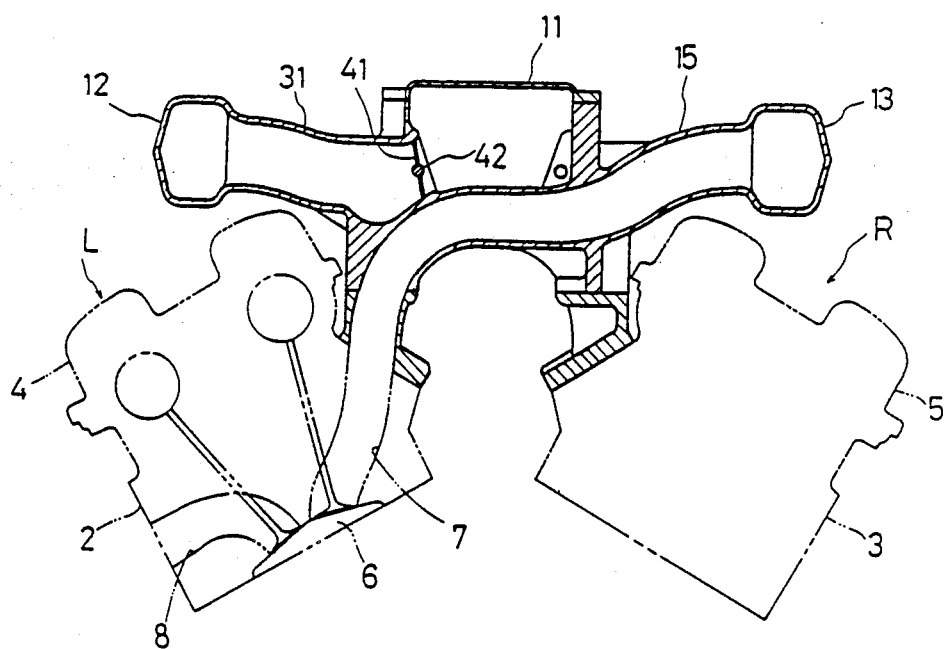
FIG. 6 is a cross-sectional view taken along line VI—VI in FIG. 5.
Figure 7:
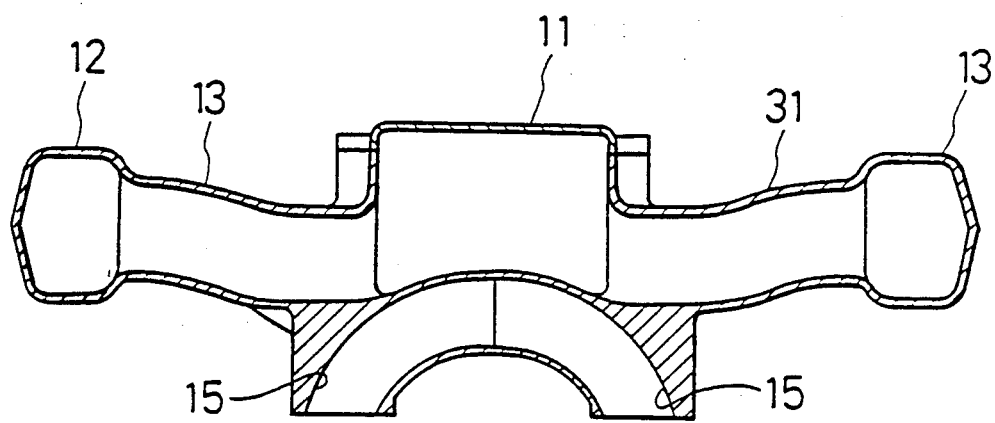
FIG. 7 is a cross-sectional view taken along line VII—VII in FIG. 5.

FIGS. 5 to 7 show a V-6 engine provided with an intake system in accordance with another embodiment of the present invention. In FIGS. 5 to 7, the parts analogous to the parts shown in FIGS. 1 to 4 are given the same reference numerals and will not be described here. In this embodiment, the bypass passages 16 are not provided, and two of the three communicating passages 31 on each side of the first surge tank 11 are provided with butterfly on-off valves 41 at the first surge tank side end portions thereof. In this particular embodiment, the central communicating passage 31 on each side of the first surge tank 11 is not provided with the on-off valve. The on-off valves 41 which are disposed on opposite sides of the first surge tank 11 at one end of the cylinder row are connected to a first actuator 43 by way of shafts 42. The on-off valves 41 which are disposed on opposite sides of the first surge tank 11 at the other end of the cylinder row are connected to a second actuator 44 by way of shafts 42. The first and second actuators 43 and 44 operate under intake vacuum.

In a low engine speed range, the first and second actuators 43 and 44 close all the on-off valves 41. Accordingly, intake air introduced into the first surge tank 11 through the throttle body 22 flows into each of the second and third surge tanks 12 and 13 only through the central communicating passage 31, and then into the combustion chambers 6 through the discrete intake passages 15 and the intake ports 7. In the low engine speed range, inertia effect of intake air corresponding to the sum of the equivalent lengths of each discrete intake passage 15 and each intake port 7 is obtained.

In an intermediate engine speed range, the first actuator 43 opens the on-off valves 41 at said one end of the cylinder row and the second actuator 44 closes the on-off valves 41 at said the other end of the cylinder row. In the intermediate engine speed range, the effective volume of the surge tank is increased since the three surge tanks 11, 12 and 13 are integrated by the four communicating passages 31 (two on each side of the first surge tank 11), and accordingly the intake air interference is effectively suppressed and the inertia effect of intake air is enhanced. Further resonance effect of intake air can be obtained among the three surge tanks 11 to 13 by way of the four communicating passages 31, which further improves the charging efficiency in the intermediate engine speed range.

In a high engine speed range, the first and second actuators open all the on-off valves 41. Accordingly, the effective volume of the surge tank is further increased since the three surge tanks 11, 12 and 13 are integrated by the six communicating passages 31 (three on each side of the first surge tank 11), and the intake air interference is more effectively suppressed and the inertia effect of intake air is further enhanced. Further resonance effect of intake air can be obtained among the three surge tanks 11 to 13 by way of the six communicating passages 31, which further improves the charging efficiency in the high engine speed range.

Though, in the embodiments described above, the actuators operate under intake vacuum, they may be electrically driven under the control of a control unit which receives a signal from an engine speed sensor and outputs a control signal to the actuator.

What is claimed is:

1. An intake system for a V-type engine having a plurality of cylinders disposed in each of left and right cylinder banks comprising a central surge tank which is disposed above the space between the left and right cylinder banks and communicates with the atmosphere through a common intake passage, left and right surge tanks which are respectively disposed above the left and right cylinder banks, communicating passages which connect the central surge tank with the left and right surge tanks, and discrete intake passages which communicate the left and right surge tanks with the cylinders, at least one of the communicating passages on each side of the central surge tank being disposed between the discrete intake passages on the side of the central surge tank.

2. An intake system as defined in claim 1 in which said left surge tank is communicated with the cylinder in the right cylinder bank by way of the discrete intake passages and the right surge tank is communicated with the cylinder in the left cylinder bank by way of the discrete intake passages.

3. An intake system as defined in claim 2 in which said central surge tank communicates each of the discrete intake passages through a bypass passage which opens to the discrete intake passage at an intermediate portion of the discrete intake passage and each of the bypass passages is provided with an on-off valve which is opened in a high engine speed range.

4. An intake system as defined in claim 3 in which the on-off valves in the bypass passages connected to the discrete intake passages communicating the cylinders in the same cylinder bank are arranged in a row and driven by a shaft.

5. An intake system as defined in claim 2 in which each of said left and right surge tanks is connected with the central surge tank by the communicating passages which is the same in number with the cylinders in the cylinder bank therebelow.

6. An intake system as defined in claim 5 in which said communicating passages and the discrete intake passages on each side of the central surge tank alternate with each other.

7. An intake system as defined in claim 2 in which at least one of the communicating passages communicating each of the left and right surge tanks is provided with an on-off valve.

8. An intake system as defined in claim 7 in which three cylinders are provided in each of the left and right cylinder banks, and the communicating passages communicating each of the left and right surge tanks are three in number, two of the three communicating passages being provided with on-off valves and the two on-off valves being both closed in a low engine speed range, one of the two on-off valves being opened in an intermediate engine speed range, and the two on-off valves being both opened in a high engine speed range.

* * * * *